P. MALACOS.
PNEUMATIC TIRE.
APPLICATION FILED JAN. 23, 1918.
1,269,628.
Patented June 18. 1918.
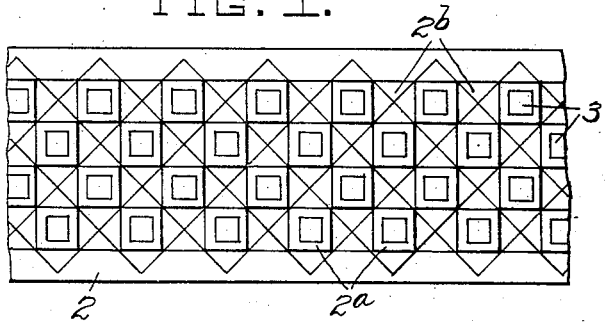
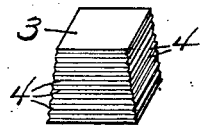
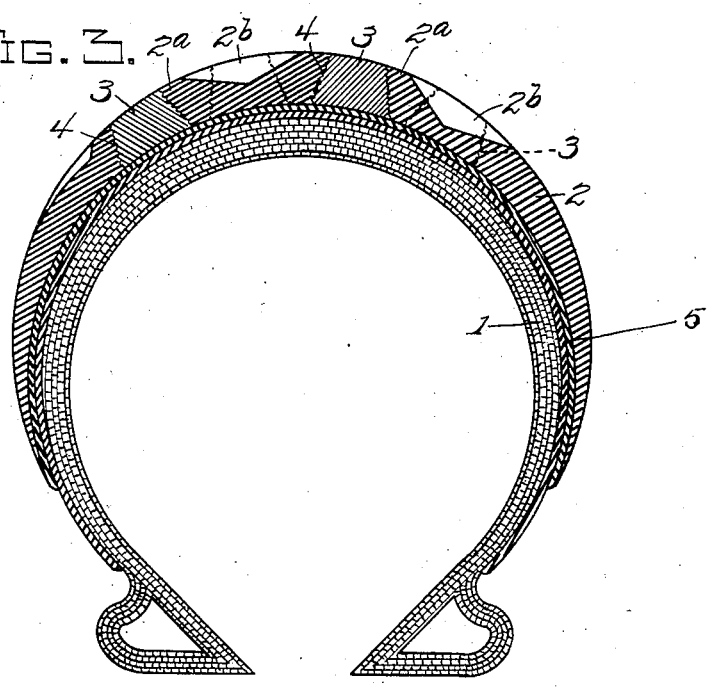
INVENTOR
Peter Malacos.
BY
H. E. Dunlap,
ATTORNEY

UNITED STATES PATENT OFFICE.

PETER MALACOS, OF WHEELING, WEST VIRGINIA.

PNEUMATIC TIRE.

1,269,628.　　　　　Specification of Letters Patent.　　Patented June 18, 1918.

Application filed January 23, 1918. Serial No. 213,409.

*To all whom it may concern:*

Be it known that I, PETER MALACOS, a subject of the King of Greece, and resident of Wheeling, county of Ohio, and State of West Virginia, have invented certain new and useful Improvements in Pneumatic Tires, of which the following is a specification.

This invention relates broadly to pneumatic tires, and more particularly to a tire having an armored tread.

The primary object of the invention is to provide a tire structure having a metal-studded tread for resisting wear, in which the studs are so disposed that the resilience of the rubber tread is not thereby appreciably diminished and that little or no injury to the underlying fabric carcass can result therefrom.

A still further object is to provide a metal-studded rubber tread for tires in which the studs and rubber are so intimately united or associated that separation thereof through ordinary wrenching strains is effectually resisted.

With these and other important objects in view, the invention resides in the features of construction which will hereinafter be fully described, reference being had to the accompanying drawings, in which—

Figure 1 is a plan view of a fragment of the tread of a tire constructed in accordance with my invention;

Fig. 2 is a perspective view of a metal stud, detached; and—

Fig. 3 is an enlarged cross section of the tire.

Referring to said drawings, in which like designating characters distinguish like parts throughout the several views—

1 indicates the carcass of a tire, the same being composed of a plurality of layers of textile or cord fabric. Superposed on said carcass is a heavy tread 2 composed of rubber having mounted therein a plurality of metal studs 3 which, introduced in said tread when the latter is in its plastic state, become firmly embedded through vulcanization. Each of said studs is of truncated pyramid shape and has its lateral faces striated by the provision of horizontally disposed grooves 4 in which rubber of the tread seats in intimate gripping relation to said faces.

Following the introduction of said studs and prior to applying the tread to the carcass, one or more thicknesses of a suitable flexible sheet material 5, as sheet rubber or a rubberized woven fabric, preferably of heat-resisting character, is applied in adhering relation to the inner surface of the tread 2, said material serving not only as a retainer for the studs during application of the unvulcanized tread, but also as a protective sheathing by means of which the bases of said studs are maintained out of contact with the carcass for preventing the frictional chafing of the latter which would otherwise be liable to result.

The road-engaging portion of the tread presents a face of checkered character, there being arranged in each of a plurality of parallel circumferential rows alternately disposed radial projections $2^a$ and recesses or depressions $2^b$, as is most clearly shown in Fig. 1. Said depressions $2^b$ are of inverted pyramidal form having a depth materially less than the thickness of that portion of the tread in which they are located, and said projections are of truncated pyramid form. The studs 3 are located centrally with respect to said projections and have their outer ends disposed flush with the corresponding ends of said projections, which latter have such dimensions that adequate stud-embracing stock is afforded for maintaining a firm grip upon said studs.

Increased resilience is afforded by the provision of the depressions $2^b$ alternated with the stud-holding projections $2^a$, it being obvious that lateral yielding distortion of said projections from their normal positions is thereby facilitated, as when the tire travels upon rough or uneven road surfaces.

As is apparent, rapid wear of the tire tread is effectually prevented by the studs which are composed of slow-wearing material.

What is claimed is—

1. A pneumatic tire comprising a fabric carcass, a rubber tread mounted on said carcass, and a plurality of metal studs embedded in said tread, said studs being projected through said tread and having their ends flush with the opposite faces of the latter, said studs being of truncated pyramid form and having their lateral faces roughened.

2. A pneumatic tire comprising a fabric carcass, a rubber tread mounted on said carcass, a plurality of metal studs embedded in said tread, said studs being projected through said tread and having their ends flush with the opposite faces of the latter, said studs being of truncated pyramid form and having their lateral faces roughened for intimate engagement with said tread, and a protective sheathing interposed between the studded tread and said carcass.

3. A pneumatic tire comprising a fabric carcass, a rubber tread mounted on said carcass, a plurality of metal studs embedded in said tread, said studs being projected through said tread and having their ends flush with the opposite faces of the latter, said studs being of truncated pyramid form and having their lateral faces striated, and a protective sheathing of flexible heat-resisting material interposed between the studded tread and said carcass.

4. A pneumatic tire comprising a rubber tread having in the road-engaging surface thereof a plurality of parallel circumferential rows of spaced depressions defining intermediate projections of truncated pyramid form, and metal studs disposed centrally with respect to said projections and having their inner ends flush with the inner surface of said tread, said studs having their lateral faces roughened for intimate engagement with said tread, and a fabric carcass upon which said tread is mounted.

In testimony whereof, I affix my signature in presence of two subscribing witnesses.

PETER MALACOS.

Witnesses:
H. E. DUNLAP,
W. F. KEEFER.